US007315279B1

(12) United States Patent
Milbourne

(10) Patent No.: US 7,315,279 B1
(45) Date of Patent: Jan. 1, 2008

(54) ANTENNA SYSTEM FOR PRODUCING VARIABLE-SIZE BEAMS

(75) Inventor: Thomas H. Milbourne, Washington Crossing, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 273 days.

(21) Appl. No.: 10/934,505

(22) Filed: Sep. 7, 2004

(51) Int. Cl.
*H04B 7/185* (2006.01)
*H01Q 3/00* (2006.01)
*G01S 3/16* (2006.01)
*H04M 1/00* (2006.01)

(52) U.S. Cl. ...................... 342/373; 342/354; 342/372; 342/374; 342/379; 455/562.1

(58) Field of Classification Search ................ 342/372, 342/373, 368, 383, 380, 374, 379, 354; 455/562.1
See application file for complete search history.

(56) References Cited

U.S. PATENT DOCUMENTS

| | | | | | |
|---|---|---|---|---|---|
| 3,368,202 | A | * | 2/1968 | Crousel | 342/373 |
| 4,032,922 | A | * | 6/1977 | Provencher | 342/373 |
| 4,360,813 | A | * | 11/1982 | Fitzsimmons | 342/350 |
| 4,408,493 | A | * | 10/1983 | Peterson | 73/643 |
| 4,489,325 | A | * | 12/1984 | Bauck et al. | 342/374 |
| 4,689,627 | A | * | 8/1987 | Lee et al. | 342/373 |
| 4,720,712 | A | * | 1/1988 | Brookner et al. | 342/383 |
| 4,799,065 | A | * | 1/1989 | Thompson | 343/779 |
| 4,839,894 | A | * | 6/1989 | Rudish et al. | 370/497 |
| 5,115,248 | A | * | 5/1992 | Roederer | 342/373 |
| 5,151,706 | A | * | 9/1992 | Roederer et al. | 342/372 |
| 5,283,587 | A | * | 2/1994 | Hirshfield et al. | 342/372 |
| 5,504,493 | A | * | 4/1996 | Hirshfield | 342/372 |
| 5,760,741 | A | * | 6/1998 | Huynh et al. | 342/373 |
| 6,104,346 | A | * | 8/2000 | Rudish et al. | 342/424 |
| 6,243,051 | B1 | | 6/2001 | Vanstrum et al. | |
| 6,577,282 | B1 | | 6/2003 | Rao et al. | |
| 6,642,908 | B2 | * | 11/2003 | Pleva et al. | 343/876 |
| 6,771,218 | B1 | * | 8/2004 | Lalezari et al. | 342/373 |
| 2002/0054580 | A1 | * | 5/2002 | Strich et al. | 370/334 |
| 2003/0189515 | A1 | * | 10/2003 | Jacomb-Hood et al. | 342/373 |

OTHER PUBLICATIONS

John B. Payne, May 1967, Wideband IF Time Delay Steering of Array Antennas, IEEE Transactions On Antennas And Propagation.*

* cited by examiner

*Primary Examiner*—Thomas H. Tarcza
*Assistant Examiner*—Hien Ly
(74) *Attorney, Agent, or Firm*—McDermott Will & Emery LLP

(57) ABSTRACT

An antenna system has multiple antenna feed elements combined in a number of element sets independently controlled to provide a beam of a variable size. Multiple input power dividers are provided for dividing an input signal, and multiple phase controllers are respectively connected to outputs of the power dividers for producing a plurality of phase-shifted signals having prescribed phases. The phase-shifted signals are supplied to respective inputs of a hybrid matrix. Predetermined outputs of the hybrid matrix are connected to summation circuitry for providing in-phase power summation of signals produced at these outputs. The antenna elements in at least one of the element sets are controlled by a sum signal produced by the summation circuitry. The other element sets may be controlled by respective output signals of the hybrid matrix.

21 Claims, 8 Drawing Sheets

100

100

| Number of Element Sets N | Hybrid Matrix Size M x M | Number of Hybrid Matrix Outputs Summed |
|---|---|---|
| 2 | 2 | |
| 3 | 4 | 2 |
| 4 | 8 | 2,4 |
| 5 | 16 | 2,4,8 |
| 6 | 32 | 2,4,8,16 |
| N | M=2^(N-1) | 2, ..., 2^(N-2) |

FIG. 3

| Beam Configuration | Input Phase Control in Degrees | | | | Hybrid Matrix & Summer Relative Output Voltages | | | Normalized Element Power | | |
|---|---|---|---|---|---|---|---|---|---|---|
| | Phi 1 | Phi 2 | Phi 3 | Phi 4 | Q1 | Q2 | Q3+Q4 | In Center | In Ring of 6 | In Ring of 12 |
| Smallest Beam Target | 0.000 | -90.000 | -90.000 | -180.000 | 1.19 | 0.00 | 0.00 | 1.000 | 0.000 | 0.000 |
| Medium Beam Target | -67.800 | -22.200 | -157.800 | -112.200 | 0.45 | 1.10 | 0.00 | 0.143 | 0.143 | 0.000 |
| | | | | | | | 0.00 | | | |
| Small to medium transition for 6 bit phase resolution | 0.000 | -90.000 | -90.000 | -180.000 | 1.19 | 0.00 | 0.00 | 1.000 | 0.000 | 0.000 |
| | -5.625 | -84.375 | -95.625 | -174.375 | 1.18 | 0.12 | 0.00 | 0.990 | 0.002 | 0.000 |
| | -11.250 | -78.750 | -101.250 | -168.750 | 1.17 | 0.23 | 0.00 | 0.962 | 0.006 | 0.000 |
| | -16.875 | -73.125 | -106.875 | -163.125 | 1.14 | 0.35 | 0.00 | 0.916 | 0.014 | 0.000 |
| | -22.500 | -67.500 | -112.500 | -157.500 | 1.10 | 0.46 | 0.00 | 0.854 | 0.024 | 0.000 |
| | -28.125 | -61.875 | -118.125 | -151.875 | 1.05 | 0.56 | 0.00 | 0.778 | 0.037 | 0.000 |
| | -33.750 | -56.250 | -123.750 | -146.250 | 0.99 | 0.66 | 0.00 | 0.691 | 0.051 | 0.000 |
| | -39.375 | -50.625 | -129.375 | -140.625 | 0.92 | 0.75 | 0.00 | 0.598 | 0.067 | 0.000 |
| | -45.000 | -45.000 | -135.000 | -135.000 | 0.84 | 0.84 | 0.00 | 0.500 | 0.083 | 0.000 |
| | -50.625 | -39.375 | -140.625 | -129.375 | 0.75 | 0.92 | 0.00 | 0.402 | 0.100 | 0.000 |
| | -56.250 | -33.750 | -146.250 | -123.750 | 0.66 | 0.99 | 0.00 | 0.309 | 0.115 | 0.000 |
| | -61.875 | -28.125 | -151.875 | -118.125 | 0.56 | 1.05 | 0.00 | 0.222 | 0.130 | 0.000 |
| | -67.500 | -22.500 | -157.500 | -112.500 | 0.46 | 1.10 | 0.00 | 0.146 | 0.142 | 0.000 |
| | -73.125 | -16.875 | -163.125 | -106.875 | 0.35 | 1.14 | 0.00 | 0.084 | 0.153 | 0.000 |

FIG. 6

| Beam Configuration | Input Phase Control in Degrees | | | | Hybrid Matrix & Summer Relative Output Voltages | | | Normalized Element Power | | |
|---|---|---|---|---|---|---|---|---|---|---|
| | Phi 1 | Phi 2 | Phi 3 | Phi 4 | Q1 | Q2 | Q3+Q4 | In Center | In Ring of 6 | In Ring of 12 |
| Large Beam Target | -120.420 | -74.830 | -105.160 | -59.570 | 0.27 | 0.67 | 0.95 | 0.053 | 0.053 | 0.053 |
| Medium to large transition for 6 bit phase resolution | -67.500 | -22.500 | -157.500 | -112.500 | 0.46 | 1.10 | 0.00 | 0.146 | 0.142 | 0.000 |
| | -73.125 | -28.125 | -151.875 | -106.875 | 0.45 | 1.09 | 0.12 | 0.145 | 0.141 | 0.001 |
| | -78.750 | -33.750 | -146.250 | -101.250 | 0.45 | 1.08 | 0.23 | 0.141 | 0.137 | 0.003 |
| | -84.375 | -39.375 | -140.625 | -95.625 | 0.44 | 1.05 | 0.35 | 0.134 | 0.130 | 0.007 |
| | -90.000 | -45.000 | -135.000 | -90.000 | 0.42 | 1.02 | 0.46 | 0.125 | 0.121 | 0.012 |
| | -95.625 | -50.625 | -129.375 | -84.375 | 0.40 | 0.97 | 0.56 | 0.114 | 0.111 | 0.019 |
| | -101.250 | -56.250 | -123.750 | -78.750 | 0.38 | 0.91 | 0.66 | 0.101 | 0.098 | 0.026 |
| | -106.875 | -61.875 | -118.125 | -73.125 | 0.35 | 0.85 | 0.75 | 0.088 | 0.085 | 0.034 |
| | -112.500 | -67.500 | -112.500 | -67.500 | 0.32 | 0.78 | 0.84 | 0.073 | 0.071 | 0.042 |
| | -118.125 | -73.125 | -106.875 | -61.875 | 0.29 | 0.70 | 0.92 | 0.059 | 0.057 | 0.050 |
| | -123.750 | -78.750 | -101.250 | -56.250 | 0.25 | 0.61 | 0.99 | 0.045 | 0.044 | 0.058 |

FIG. 7

ANTENNA SYSTEM FOR PRODUCING VARIABLE-SIZE BEAMS

FIELD OF THE INVENTION

The present invention relates to antennas, and particularly to an antenna system capable of providing a beamwidth variable over a wide size range.

BACKGROUND

In antenna systems, such as satellite antenna systems used, for example, in a global positioning system (GPS) or in a communications system, a size of a produced beam is selected to cover a particular country or a geographic area. A beam size can be varied to increase or reduce a covered area.

For example, U.S. Pat. No. 6,243,051 discloses a dual helical antenna for a GPS including a reflector and a focal point. Two multi-turn axial mode helical antenna elements are arranged on a support shaft extending axially from the reflector to the focal point. One of the helical antenna elements is disposed at the focal point, and the other antenna element is disposed at a defocused position to broaden the beam and covered area.

However, this antenna system is constrained to large and small beams only, and provides no medium or middle beam size setting because a beam size cannot be continuously varied. Also, for multi-frequency applications, such as a GPS, the relative beamwidths are dependent and constrained to be proportional to frequency. In addition, power handling capability of the system is limited by a single feed element.

Another example of an antenna system with a variable-size beam is presented in U.S. Pat. No. 6,577,282 that discloses a system for zooming and reconfiguring circular beams. The system includes a feed horn, a subreflector, a main reflector, and a connecting structure. The feed horn is pointed at an axis removed from the bisector axis of the subreflector. A size of the produced beam is changed by changing the distance between the feed horn and the subreflector.

This system changes a beam size mechanically. The system requires a moving mechanism for changing the distance between the feed horn and the subreflector. Such a mechanism reduces reliability and increases weight of the system. Further, for multi-frequency applications, the relative beamwidths are dependent and constrained to be proportional to frequency. Moreover, the system is restricted to beams of a circular nature.

A system for electronically controlling a beam size is disclosed in U.S. Pat. No. 5,151,706. This system includes an array of N radiating elements subdivided into P subarrays of M elements each, a common signal source, a power divider that distributes the signal delivered by the source, amplifiers, and means for selectively exciting some of the elements with the amplified signal at a controlled phase shift so as to obtain a desired radiation pattern.

There are several significant drawbacks to this approach. First, the total power that can be directed to any one output is only a fraction of the total amplifier power, because the power divider is segmented corresponding to subarrays each driven by only a subset of the power amplifiers. Further, this concept is limited to arrays, which can be properly excited when the power from each coupler is directed into elements which are uniformly interleaved with elements driven from the other couplers. This element interleaving constraint is necessary to work within the limitation of the subarray couplers, which is that the input power to any coupler can only be directed into a single output or into two outputs independently. Power cannot be directed to 3 coupler outputs, and when power is directed to 4 outputs from any given coupler, the amplitudes cannot be controlled independently. Moreover, this concept is limited to excitation of linear or radial arrays and does not allow a beam to be varied in two dimensions.

SUMMARY OF THE INVENTION

The subject matter disclosed herein solves these problems by providing an antenna system performing the proper summation of coupler outputs in order to make various sets of antenna elements independently controllable in amplitude. In particular, the antenna system includes multiple antenna feed elements combined in a number of element sets. Multiple input power dividers are provided for dividing an input signal, and multiple phase controllers are respectively connected to outputs of the power dividers for producing a plurality of phase-shifted signals having prescribed phases. The phase-shifted signals are supplied to respective inputs of a hybrid matrix. Predetermined outputs of the hybrid matrix are connected to summation circuitry for providing in-phase power summation of signals produced at these outputs. The antenna elements in at least one of the element sets are controlled by a sum signal produced by the summation circuitry. The other elements sets may be controlled by respective output signals of the hybrid matrix. Hence, the antenna element sets are independently controlled to produce a beam of a required size.

According to an aspect of the present invention, the summation circuitry may include multiple summation circuits, each of which is configured for summing a prescribed number of output signals produced by the hybrid matrix. For example, if the antenna system includes N element sets, antenna element sets 3, 4, 5, 6, . . . , N may be independently controlled by the respective sum signals produced by the summation circuits that respectively provide in-phase power summation of 2, 4, 8, 16, . . . , 2ˆ(N−2) outputs of the hybrid matrix. Antenna element sets 1 and 2 may be independently controlled by signals formed at the remaining two outputs of the hybrid matrix, which are not being summed by the summation circuits.

The phase controllers are controlled to set phases at the inputs of the hybrid matrix to provide proper relative power among the element sets required to achieve a desired beam size. The input signal phases may be incremented by equal phase shift values to vary the beam size.

Multiple amplifiers may be connected between the phase controllers and the inputs of the hybrid matrix to provide the hybrid matrix input signals at equal and constant levels. Output power dividers may be provided for each multi-element set to deliver power to each antenna element in the set. The output power dividers are supplied with either the sum signal from the summation circuitry or the output signal of the hybrid matrix.

In accordance with another aspect of the invention, the antenna system is capable of operating at multiple different frequencies. A separate set of input power dividers, phase controllers and amplifiers may be provided for handling an input signal at each frequency. A coupling device, such as a diplexer, may be coupled to each input of the hybrid matrix for supplying signals of different frequencies. The antenna system is capable of controlling the beamwidth at each frequency independently.

In accordance with an embodiment of the invention, the antenna system may include a reflector configured for steering a beam produced by the antenna elements. For example, a gimbaled reflector may be utilized.

In accordance with a further aspect of the invention, a look-up beam table of available beam sizes may be produced based on phase control resolution. For each beam size, the look-up beam table may include corresponding phase settings required to obtain this beam size. The look-up beam table may be used during operations of the antenna system to determine phase settings required to produce a desired beam size.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein

FIG. 3 is a table illustrating a summation procedure of the present invention.

FIG. 6 is a table illustrating phase settings to provide a transition from a small beam size to a medium beam size.

FIG. 7 is a table illustrating phase settings to provide a transition from a medium beam size to a large beam size.

DETAILED DISCLOSURE OF THE INVENTION

Figure 1:
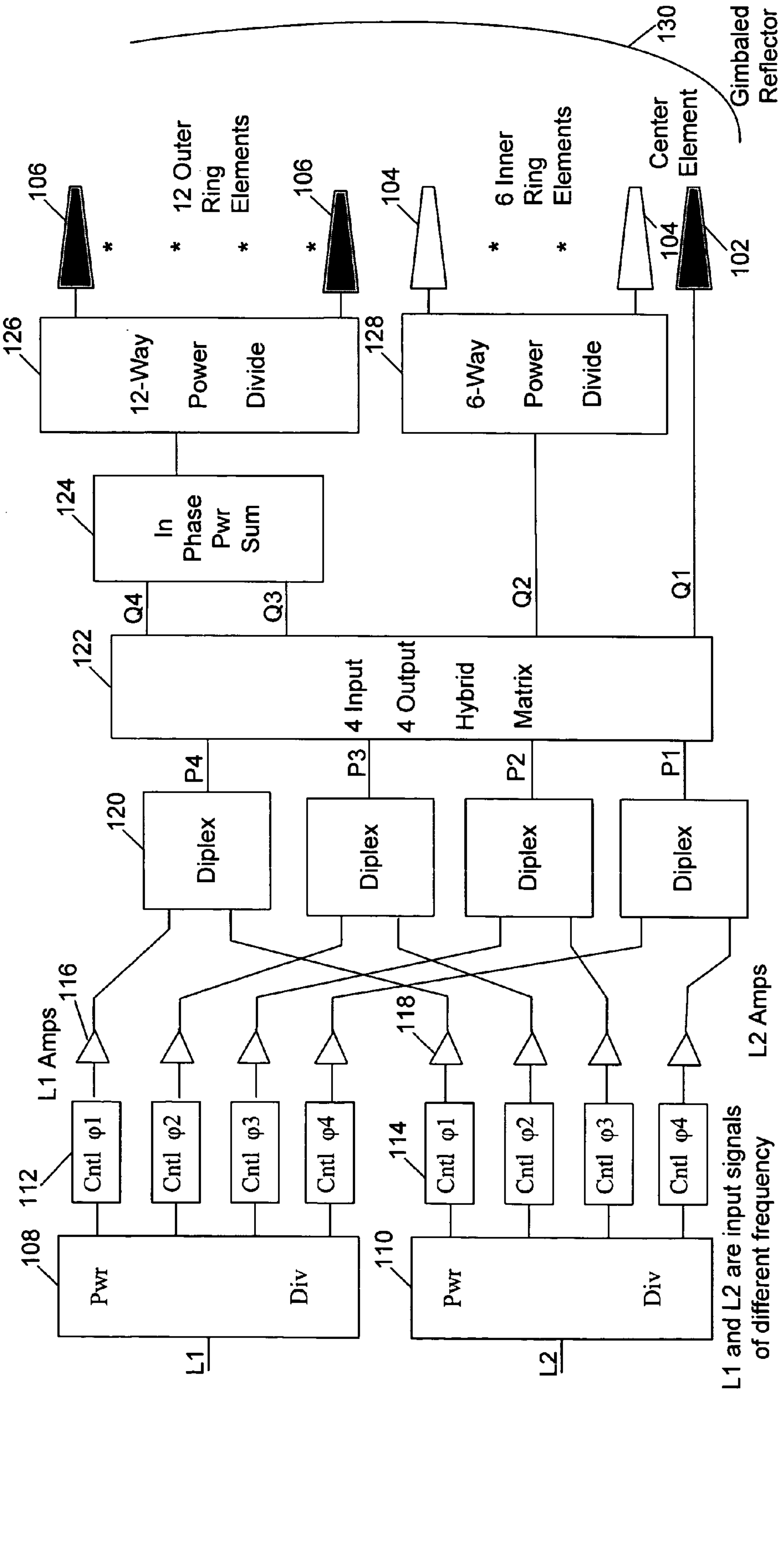
FIG. 1 is a block diagram showing an exemplary embodiment of an antenna system of the present invention.

FIG. 1 is a block diagram of an exemplary antenna system 100 according to the invention. The system 100 can be used in a number of different applications including a global positioning system (GPS), a satellite communications system, a radar system, etc. Although FIG. 1 shows that the system 100 operates at two frequencies L1 and L2 appropriate for the GPS (e.g. L1=1575,42 MHz, L2=1227,5 MHz), one skilled in the art would realize that the antenna system of the present invention is able to operate at a single frequency as well as at any number of various frequencies.

Figure 2:
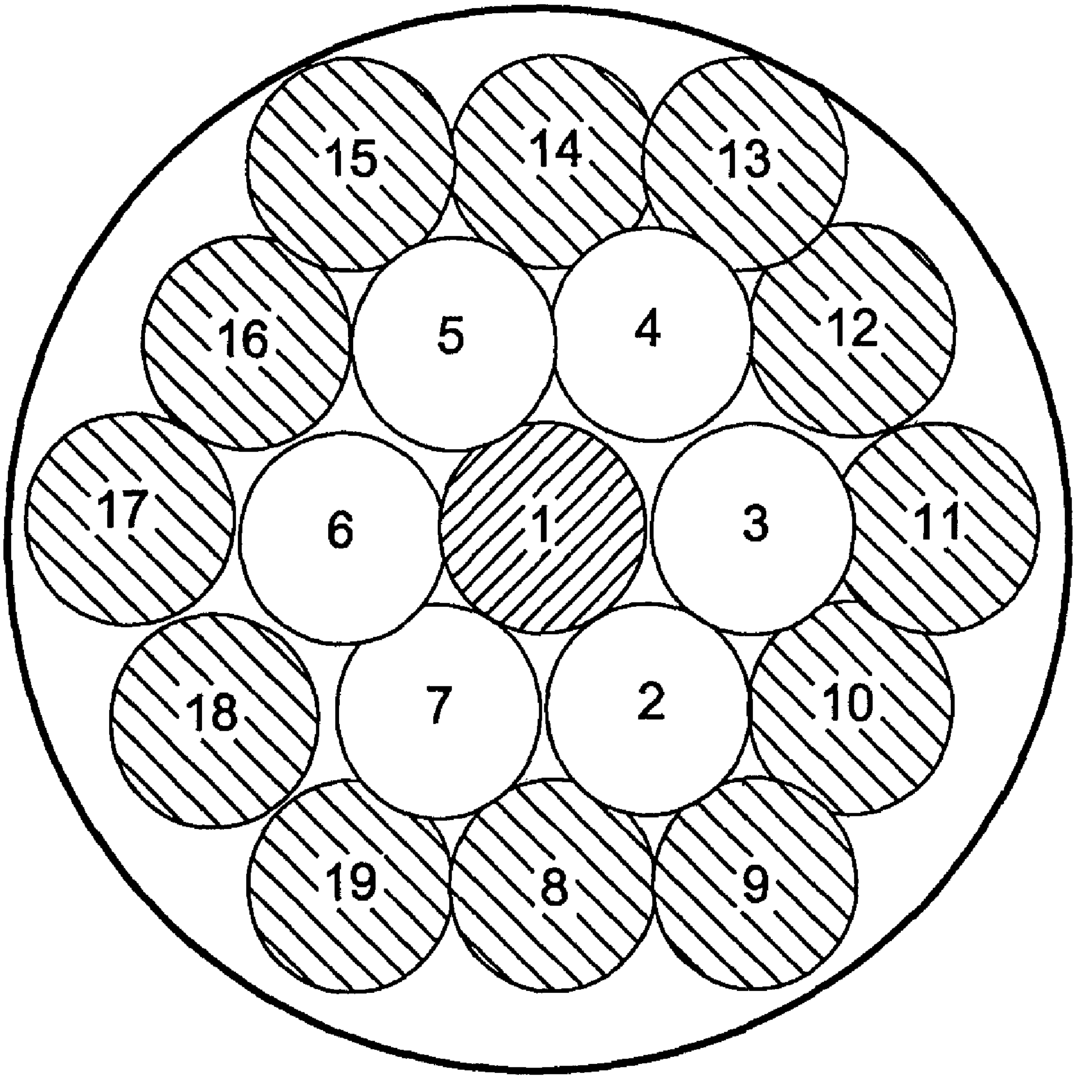
FIG. 2 is a diagram illustrating a cluster of antenna feed elements combined into independently controlled element sets.

In the example illustrated in FIG. 1, antenna feed elements of the antenna system 100 are combined in three element sets. The first element set may include a center element 102, the second element set may include 6 inner ring elements 104, and the third element set may include 12 outer ring elements 106. FIG. 2 illustrates a cluster of antenna feed elements, in which element 1 is the center feed element, elements 2 to 7 surrounding the central feed element are the inner ring elements, and elements 8 to 19 surrounding the inner ring elements are the outer ring elements. When only a single center feed element is excited, it illuminates a small coverage area. When the central element and the 6 inner feed elements are excited in phase, this cluster may illuminate a coverage area about 3 times larger than the coverage area of the single central feed element. The cluster including the central feed element, the 6 inner feed elements and the 12 outer ring elements with all 19 feed elements excited in phase, may illuminate a coverage area about 5 times larger than the coverage area of the single central feed element. Hence, by controlling relative power supplied to the different sets of feed elements, small, intermediate and large beam sizes may be produced, where the large beam size is up to 5 times larger than the small beam size.

Referring back to FIG. 1, input signals L1 and L2 of different frequencies are respectively supplied to power dividers 108 and 110, each of which equally distributes the power among multiple phase shifters. Divided signals L1 may be supplied to 4 phase shifters 112, and divided signals L2 may be input to 4 phase shifters 114. The first to fourth phase shifters of each group 112 and 114 shift the phase of the divided signals by pre-set phase angles (ϕ1, ϕ2, ϕ3 and ϕ4, respectively. As discussed in more detail below, the phase angles are selected to obtain a required beam size. Two groups of amplifiers 116 and 118 are connected to the outputs of the respective phase shifters for amplifying phase shifted signals L1 and L2. Each amplifier group 116 and 118 includes 4 amplifiers that may run at equal and constant output levels. The first to fourth amplifiers of each group 116 and 118 are respectively connected to the first to fourth diplexers 120 respectively supplying the amplified signals L1 and L2 to the first to fourth inputs of a hybrid matrix 122.

The four input signals of the hybrid matrix 122 have equal amplitudes, and phases independently controlled to obtain required voltages at four outputs of the matrix 122. As discussed in more detail below, the hybrid matrix 122 includes a combination of 90 degree hybrid couplers that may divide the power of each of the input signals and combine parts of their power into a single output signal. Further, the hybrid matrix 122 is capable of providing any power combination of the input signals at two outputs, where the other two outputs are at zero values. In addition, the hybrid matrix 122 may provide any power combination between sums of two outputs, where power ratio within each sum is equal. Equal relative phases at the outputs of the hybrid matrix 122 can be maintained for achieving capabilities described above.

One or more summing circuits 124 are connected to predetermined hybrid matrix outputs to provide in-phase power summing of the signals formed at these outputs. The number of the outputs being summed depends on the number of element sets utilized in the antenna system. In particular, for 3 element sets 102, 104 and 106 illustrated in FIG. 1, two outputs of the hybrid matrix 122 is summed. The resulting sum signal is supplied to one of the element sets, for example, to the set 106 combining the outer ring elements. The remaining two element sets 102 and 104 are supplied with the remaining two output signals which are not being summed. Power dividers 126 and 128 may be utilized to divide power of signals supplied to the respective element sets 106 and 104 in order to deliver the power to individual antenna elements of the sets.

In general, as illustrated in a table shown in FIG. 3, if the antenna system 100 utilizes N independently controlled element sets, the hybrid matrix 122 has M=2^(N−1) inputs and the same number of outputs. Summation circuitry connected to the hybrid matrix 122 for summing signals formed at predetermined outputs may include N−2 summation circuits. Two of N available element sets, for example, sets 1 and 2, may be supplied with the respective two output signals of the hybrid matrix which are not being supplied to the summation circuits. Each of the remaining N−2 element sets is supplied with a sum signal produced by the respective summation circuit.

To produce the respective sum signal, the summation circuit for element set 3 may sum 2 output signals of the hybrid matrix 122, the summation circuit for element set 4 may sum the other 4 output signals of the matrix 122, the summation circuit for element set 5 may determine the sum of the next 8 output signals, the summation circuit for element set 6 may sum the next 16 output signals, and finally, the summation circuit for element set N may determine the sum of the signals at the other 2^(N−2) outputs of the hybrid matrix 122.

Hence, antenna element sets 3, 4, 5, 6, . . . , N may be independently controlled by the respective sum signals produced by the summation circuits that respectively provide in-phase power summation of 2, 4, 8, 16, . . . , 2^(N−2) outputs of the hybrid matrix 122. Antenna element sets 1 and 2 may be independently controlled by signals formed at the remaining two outputs of the hybrid matrix 122, which are not being summed by the summation circuits.

Figure 4:
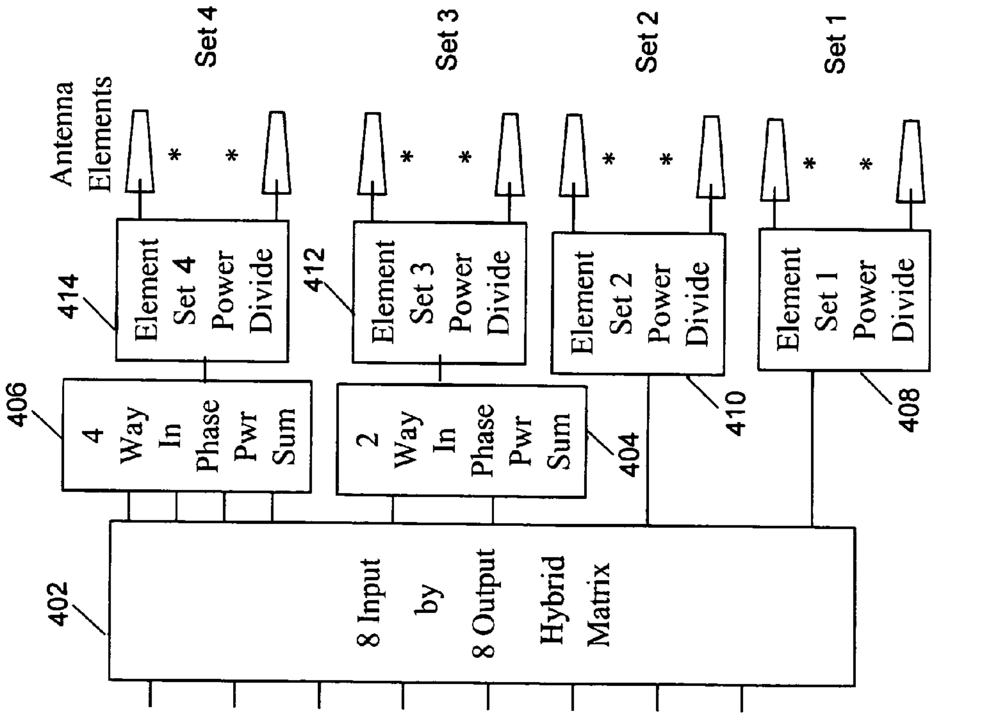
FIG. 4 is a diagram that illustrates summing for 4 element sets.

For example, as shown in FIG. 4, which illustrates summing for 4 element sets, sets 1 and 2 may be supplied with the respective two output signals of an 8 input by 8 output hybrid matrix 402 which are not being supplied to the summation circuits. A summation circuit 404 for element set 3 sums 2 output signals of the hybrid matrix 402, and a summation circuit 406 for element set 4 may sum the other 4 output signals of the matrix 402. Power dividers 408, 410, 412 and 414 respectively distribute power among the elements of sets 1, 2, 3 and 4.

Therefore, the size of a beam produced by the antenna elements can be continuously varied using low power level independent RF phase control of the element sets described above. A gimbaled reflector 130 may be provided for steering a beam formed by the antenna element. For example, for three element sets, the antenna reflector may be 9.6 meters in diameter. Beamwidth size may be variable from the minimum size of about 440 km and 550 km for signals L1 and L2, respectively, up to the maximum size about 5 times and 4 times, respectively, larger than the minimum size. Beamwidth control is independent for each frequency. Beam steering is provided by gimbaling the reflector angle, and results in identical L1 and L2 beam pointing.

Figure 5:
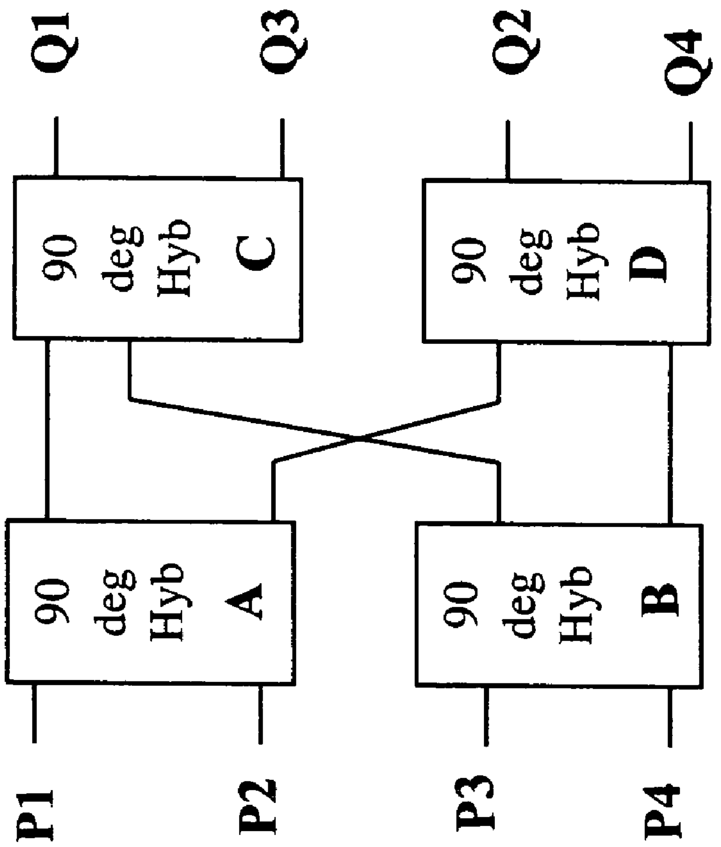
FIG. 5 is a simplified diagram illustrating a hybrid matrix of the present invention.

FIG. 5 illustrates an exemplary hybrid matrix 122 having 4 inputs P1, P2, P3 and P4 and 4 outputs Q1, Q2, Q3 and Q4. The hybrid matrix 122 includes a pair of input 90 degree hybrid couplers A and B, and a pair of output 90 degree hybrid couplers C and D. Each of the hybrid couplers has 2 inputs and 2 outputs. The hybrid coupler A has inputs P1 and P2 of the hybrid matrix 122, and the hybrid coupler B has inputs P3 and P4 of the hybrid matrix 122. The hybrid coupler C has outputs Q1 and Q3 of the hybrid matrix 122, and the hybrid coupler D has outputs Q2 and Q4 of the hybrid matrix 122.

Each of the 90 degree hybrid couplers produces output signals, which are shifted in phase by 90 degrees with respect to each other. Signals at the inputs P1, P2, P3 and P4 have equal amplitudes and independently controlled phases. First and second outputs of the input coupler A are respectively connected to first inputs of the output couplers C and D, whereas first and second outputs of the input coupler B are respectively connected to the other inputs of the output couplers C and D. This connection enables the hybrid matrix 122 to divide the power of each of the input signals and combine parts of their power into a single output signal. Further, the hybrid matrix 122 is capable of providing any power combination of the input signals at two outputs, where the other two outputs are at zero values. In addition, the hybrid matrix 122 may provide any power combination between sums of two outputs, where power ratio within each sum is equal.

FIG. 6 shows a table illustrating independent phase control of inputs signals of the hybrid matrix 122 to achieve a transition from a small beam size to a medium beam size, and FIG. 5 shows a table illustrating phase control of inputs signals of the hybrid matrix 122 to achieve a transition from a medium beam size to a large beam size. As shown in FIG. 4, when phases Phi1, Phi2, Phi3 and Phi4 of respective signals at inputs P1, P2, P3 and P4 of the hybrid matrix are set at 0.000, −90.000, −90.000 and −180.000 degrees, all power is transferred to output Q1 of the hybrid matrix 122 supplying the center antenna element 102. As a result, the antenna beam width is made minimum. The phase of the input signals may be set by the phase shifters 112 and 114 for signals L1 and L2, respectively.

For 6-bit phase control, a transition from the minimum size of a beam to a larger size may be made in increments defined by a phase shift of 5,625 degrees, i.e., in each step of phase control, each of the phases Phi1, Phi2, Phi3 and Ph±4 may be shifted by 5,625 degrees to achieve a larger beam size. This shift is performed by the phase shifters 112 and 114 for signals L1 and L2, respectively. For example, when phases Phi1, Phi2, Phi3 and Phi4 are set at −67,500, −22.500, −157.500 and −112.500 degrees, the voltage at output Q1 is 0.46 V, and the voltage at output Q2 is 1.10 V. Consequently, more power is transferred to the set 104 supplied via the output Q2 than to the set 102 supplied via the output Q1. Power is transferred almost equally to the center element and the 6 inner elements, and the resulting beam size is in the middle of the size range. The table in FIG. 6 shows that at these phase settings at the inputs of the hybrid matrix, the normalized power at the center element and inner ring elements is 0.146 and 0.142 watts respectively or equal within 0.13 dB.

As shown in FIG. 7, a large beam size may be obtained, for example, when phases Phi1, Phi2, Phi3 and Phi4 are set at −120.420, −74.830, −105.160 and −59.570 degrees. At these phase settings, voltages at outputs Q1, Q2, and Q3 plus Q4 are equal to 0.27 V, 0.67 V, and 0.95 V, respectively. Power is transferred to all 19 antenna elements with near equal power per element enabling the antenna system to provide a large beamwidth.

Hence, the respective phase shifters 112 and 114 may be controlled to set phases of the input signals of the hybrid matrix 122 to predetermined values required to obtain a desired beam size. For example, a look-up beam table of available beam sizes based on phase control resolution may be produced when the antenna system 100 is manufactured. For each beam size, the look-up beam table may include corresponding phase shifter settings required to obtain this beam size. The look-up beam table may be used during operations of the antenna system to determine phase shifter settings required to produce a desired beam size. For example, for a space application of the antenna system 100, the look-up beam table may be loaded in a space vehicle processor. Based on this table, the processor determines phase shifter settings required to provide a desired beam size, and sends them to phase shifter interface of each amplifier 116 or 118. Also, the processor may issue the respective command to position the gimbaled reflector 130 for a desired beam pointing angle.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

Figure 8:
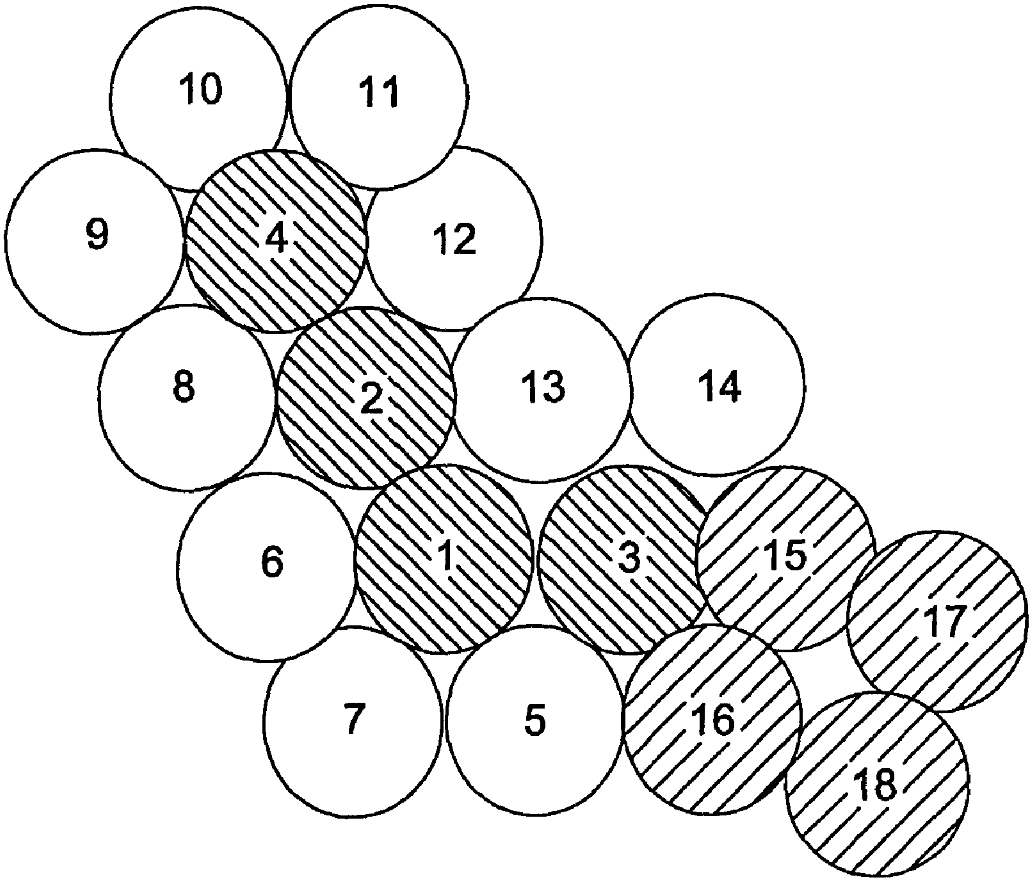
FIG. 8 is a diagram illustrating an example of noncircular variable coverage.

For example, the present invention is capable of providing not only a circular variable beam based on a circular element cluster illustrated in FIG. 2 but also a noncircular variable beam. FIG. 8 shows an example of noncircular variable beam coverage based on 3 sets of antenna elements. Set 1 includes elements 1 to 4, set 2 includes elements 5 to 14, and set 3 is composed of elements 15 to 18. The sets may be independently controlled in a manner described above to form a variable beam size.

The embodiments described herein above are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. An antenna system comprising:

a plurality of input power dividers for dividing an input signal;

a plurality of phase controllers respectively connected to outputs of the plurality of input power dividers for producing a plurality of phase-shifted signals having prescribed phases;

a hybrid matrix having a plurality of inputs for receiving the plurality of phase-shifted signals, and a plurality of outputs;

summation circuitry for summing signals produced at predetermined outputs of the hybrid matrix; and multiple antenna elements combined in a number of element sets for producing a beam of a variable size, the antenna elements in at least one of the element sets being responsive to a sum signal produced by the summation circuitry, wherein the summation circuitry is configured for independently controlling the element sets to produce the beam of a required size.

2. The system of claim 1, wherein the summation circuitry includes multiple summation circuits, each of which is configured for summing a prescribed number of output signals produced by the hybrid matrix.

3. The system of claim 2, wherein the number of the output signals summed by a first summation circuit of the summation circuitry differs from the number of the output signals summed by a second summation circuit of the summation circuitry.

4. The system of claim 2, wherein each of the summation circuits is configured to provide a produced sum signal to a separate element set of the antenna elements.

5. The system of claim 1, wherein the phase controllers are configured for setting the prescribed phases at the inputs of the hybrid matrix to produce the beam of a required size.

6. The system of claim 5, wherein the phase controllers are configured to shift a phase of each signal at the inputs of the hybrid matrix to change the size of the beam.

7. The system of claim 6, wherein the phase controllers are configured to shift the phase of each signal at the inputs of the hybrid matrix by the same value.

8. The system of claim 1, further comprising a plurality of amplifiers coupled to outputs of the respective phase controllers, and having equal and constant output levels.

9. The system of claim 1, further comprising an output power divider coupled to one of the element sets for providing power to each antenna element in the element set.

10. The system of claim 9, wherein the power divider is configured for receiving the sum signal from the summation circuitry.

11. The system of claim 9, wherein the power divider is configured for receiving an output signal of the hybrid matrix.

12. The system of claim 1, wherein the input power dividers are configured for receiving multiple input signals at different frequencies.

13. The system of claim 12, further comprising a plurality of diplexers coupled to the inputs of the hybrid matrix for supplying two signals of different frequencies.

14. The system of claim 1, further comprising a reflector configured for steering the beam produced by the antenna elements.

15. A method of operating an antenna system having a hybrid matrix and multiple antenna elements combined in a number of element sets to produce a beam of a variable size, comprising the steps of:

setting phases of input signals of the hybrid matrix to predetermined values required to obtain a desired beam size;

summing signals formed at predetermined outputs of the hybrid matrix to produce at least one sum signal; and supplying said at least one sum signal to at least one of the element sets, wherein the summing signals are configured to independently control the at least one of the element sets to produce the beam of a required size.

16. The method of claim 15 further comprising the step of supplying another one of the element sets with an output signal of the hybrid matrix.

17. The method of claim 15, wherein the phases of the input signals of the hybrid matrix are set in accordance with a look-up table indicating correspondence between the phases and a beam size.

18. A system for producing a beam of a variable size, comprising:

a power divider for dividing an input signal to produce a plurality of divided signals;

a plurality of phase shifters respectively responsive to the plurality of divided signals for producing a plurality of phase-shifted signals having prescribed phases;

a hybrid matrix having a plurality of inputs for receiving the plurality of phase-shifted signals, and a plurality of outputs;

multiple antenna elements combined in N element sets for producing a beam of a variable size, where $N \geqq 3$; and summation circuitry for summing signals produced at least at 2ˆ(N−2) outputs of the hybrid matrix to produce at least one sum signal supplied to at least one of the N element sets, wherein the summation circuitry is configured for independently controlling the N element sets to produce the beam of a required size.

19. The system of claim 18, wherein the hybrid matrix has 2ˆ(N−1) inputs.

20. The system of claim 18, wherein the summation circuitry performs in-phase power summation of the signals at the outputs of the hybrid matrix.

21. The system of claim 18, further comprising a plurality of power amplifiers connected between the plurality of phase shifters and the respective inputs of the hybrid matrix to produce a plurality of input signals of the hybrid matrix having equal amplitudes.

* * * * *

UNITED STATES PATENT AND TRADEMARK OFFICE

CERTIFICATE OF CORRECTION

PATENT NO. : 7,315,279 B1
APPLICATION NO. : 10/934505
DATED : January 1, 2008
INVENTOR(S) : Thomas H. Milbourne It is certified that error appears in the above-identified patent and that said Letters Patent is hereby corrected as shown below:

In Column 3, line 58 “(e.g. L1 = 1575,42 MHz, L2 = 1227,5” should be --(e.g. L1 = 1575.42 MHz, L2 = 1227.5--.

In Column 6, line 33 “Ph±4” should be --Phi4--.

In Column 6, line 36 “ -67,500,” should be -- -67.500,--.

Signed and Sealed this

Seventh Day of October, 2008

JON W. DUDAS
*Director of the United States Patent and Trademark Office*